US008107689B2

(12) United States Patent  (10) Patent No.: US 8,107,689 B2
Tsunoda  (45) Date of Patent: Jan. 31, 2012

(54) APPARATUS, METHOD AND COMPUTER PROGRAM FOR PROCESSING INFORMATION

(75) Inventor: Tomohiro Tsunoda, Tokyo (JP)

(73) Assignee: Sony Corporation, Tokyo (JP)

( * ) Notice: Subject to any disclaimer, the term of this patent is extended or adjusted under 35 U.S.C. 154(b) by 995 days.

(21) Appl. No.: 12/046,322

(22) Filed: Mar. 11, 2008

(65) Prior Publication Data

US 2008/0247610 A1   Oct. 9, 2008

(30) Foreign Application Priority Data

Apr. 4, 2007  (JP) ............................... P2007-098567

(51) Int. Cl.
 *G06K 9/00*  (2006.01)
(52) U.S. Cl. ....................................... 382/118; 382/100
(58) Field of Classification Search ................... 382/118
 See application file for complete search history.

(56) References Cited

U.S. PATENT DOCUMENTS

| | | | |
|---|---|---|---|
| 6,661,906 B1 * | 12/2003 | Kawade et al. | 382/118 |
| 6,671,391 B1 * | 12/2003 | Zhang et al. | 382/118 |
| 2001/0031073 A1 * | 10/2001 | Tajima | 382/118 |
| 2002/0135618 A1 * | 9/2002 | Maes et al. | 345/767 |
| 2004/0190775 A1 * | 9/2004 | Miller | 382/190 |
| 2006/0195475 A1 * | 8/2006 | Logan et al. | 707/104.1 |
| 2007/0098231 A1 * | 5/2007 | Minato | 382/118 |
| 2008/0247610 A1 * | 10/2008 | Tsunoda | 382/118 |
| 2010/0149177 A1 * | 6/2010 | Miller | 345/419 |

FOREIGN PATENT DOCUMENTS

| | | |
|---|---|---|
| JP | 10-326278 | 12/1998 |
| JP | 2001-167110 | 6/2001 |
| JP | 2002-189724 | 7/2002 |
| JP | 2006-33659 | 2/2006 |
| JP | 2006-80803 | 3/2006 |
| JP | 2006-202301 | 8/2006 |
| JP | 2006-343791 | 12/2006 |
| JP | 2007-65766 | 3/2007 |
| WO | WO-2006/025272 A1 | 3/2006 |

OTHER PUBLICATIONS

Okumura et al., "Clustering of Face Features for Listing Performers in TV-Programs", FIT2006, Fifth Information Science and Technology Forum, Public Lecture Memoirs, Third Separate Volume, Corporate Judicial Person Institute of Electronics, Information and Communication Engineers, Information Processing Society of Japan, pp. 29-30, Aug. 21, 2006.

Office Action from the Japanese Patent Office for Japanese Patent Application No. 2007-098567, (Dec. 2, 2008).

* cited by examiner

*Primary Examiner* — Sath V Perungavoor

(74) *Attorney, Agent, or Firm* — Finnegan, Henderson, Farabow, Garrett & Dunner, L.L.P.

(57) ABSTRACT

An information processing apparatus for generating a database indicating mapping between characters and the characters' face images, includes a list generating unit for generating a list of characters, appearing in a video content, based on metadata of the video content, a detecting unit for detecting a character's face image from the video content, a model generating unit for generating a feature quantity model indicating a feature of the detected character's face image and a mapping unit for mapping the feature quantity model generated based on the video content to a character contained in the character list.

7 Claims, 10 Drawing Sheets

FIG. 3

| CONTENT DB ||
|---|---|
| CONTENT ID | CONTENT LOCATION INFORMATION |
| ⋮ | ⋮ |
| CONTENT ID | CONTENT LOCATION INFORMATION |

CHARACTER RELATED INFORMATION DB (23)

| CHARACTER ID | NAME | PRONUNCIATION GUIDANCE | ALPHABETICAL REPRESENTATION | HOME TOWN | BIRTH DAY | DEBUT TIME | RELATED CHARACTER ID | URL | OTHER INFORMATION |
|---|---|---|---|---|---|---|---|---|---|
| ... | ... | ... | ... | ... | ... | ... | ... | ... | ... |
| CHARACTER ID | NAME | PRONUNCIATION GUIDANCE | ALPHABETICAL REPRESENTATION | HOME TOWN | BIRTH DAY | DEBUT TIME | RELATED CHARACTER ID | URL | OTHER INFORMATION |

FIG. 5

| | CHARACTER LIST | | |
|---|---|---|---|
| | CHARACTER ID | CASTING INFORMATION | ORDER OF DISPLAYING |
| CONTENT ID | ⋮ | ⋮ | ⋮ |
| | CHARACTER ID | CASTING INFORMATION | ORDER OF DISPLAYING |

| CHARACTER AND FEATURE QUANTITY MODEL DB | | | | | | |
|---|---|---|---|---|---|---|
| CHARACTER ID | FACE LOOKING ANGLE | PHOTOGRAPHING DATE | TYPE | FEATURE QUANTITY MODEL ID | PROBABILITY | MANUAL UPDATING HISTORY |
| ... | ... | ... | ... | ... | ... | ... |
| CHARACTER ID | FACE LOOKING ANGLE | PHOTOGRAPHING DATE | TYPE | FEATURE QUANTITY MODEL ID | PROBABILITY | MANUAL UPDATING HISTORY |

30

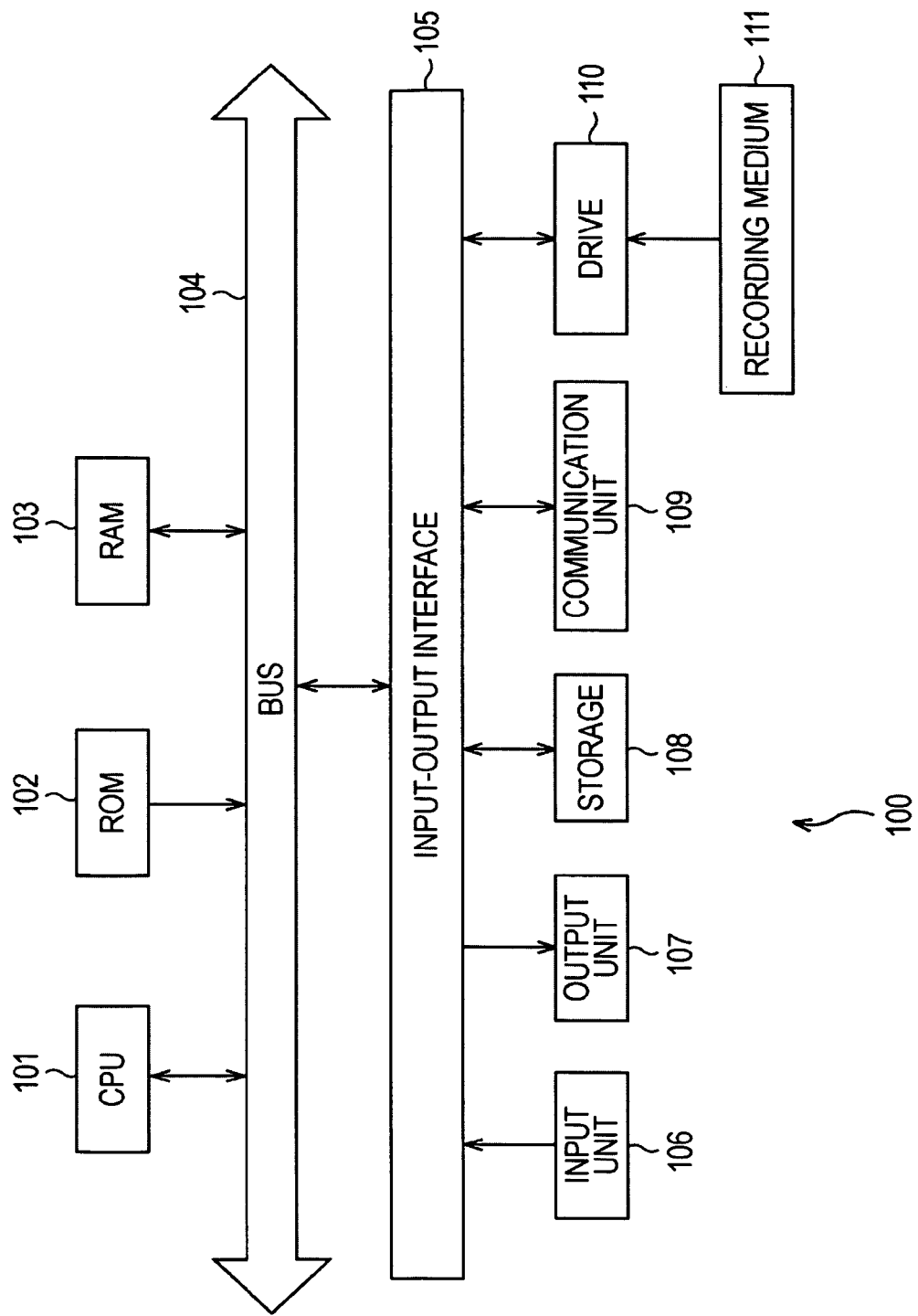

APPARATUS, METHOD AND COMPUTER PROGRAM FOR PROCESSING INFORMATION

CROSS REFERENCES TO RELATED APPLICATIONS

The present invention contains subject matter related to Japanese Patent Application JP 2007-098567 filed in the Japanese Patent Office on Apr. 4, 2007, the entire contents of which are incorporated herein by reference.

BACKGROUND OF THE INVENTION

1. Field of the Invention

The present invention relates to an information processing apparatus, an information processing method and a computer program and, in particular, to an information processing apparatus, an information processing method and a computer program for generating a database indicating a mapping between characters and respective face images based on a video content such as a television program.

2. Description of the Related Art

For example, Japanese Unexamined Patent Application Publication No. 2002-189724 discloses a technique of detecting a person's face in a moving picture or a still picture and identifying whose face it is.

In the related art, a database (hereinafter referred to as DB) having recorded characters (persons) and feature quantity models indicating the features of the characters mapped to the characters is referenced, a feature quantity model of a detected face image is compared with the feature quantity models on the database, and a character having the highest correlation is identified as the character having the detected face image.

SUMMARY OF THE INVENTION

The DB in the related art having recorded the characters and the feature quantity models of the faces mapped to the characters is manually constructed. If the DB is automatically constructed using a computer, for example, an amount of data to be stored on the DB (the number of characters and the feature quantity models of the faces of the characters) is increased more rapidly than in manual input operation. More characters are thus expected to be recognized.

The DB of related art cannot cope with a change in the face of a person with aging process and a change in the feature of the face resulting from makeup or disguise. In such a case, the DB also needs to be manually updated.

It is thus desirable to construct automatically a database indicating mapping between characters and feature quantity models of faces based on a video content.

In accordance with one embodiment of the present invention, an information processing apparatus for generating a database indicating mapping between characters and the characters' face images, includes a list generating unit for generating a list of characters, appearing in a video content, based on metadata of the video content, a detecting unit for detecting a character's face image from the video content, a model generating unit for generating a feature quantity model indicating a feature of the detected character's face image, and a mapping unit for mapping the feature quantity model generated based on the video content to a character contained in the character list.

The information processing apparatus may further include a classifying unit for classifying into feature quantity model groups a plurality of feature quantity models, generated from the video content, according to a similarity and generating a representative model representing a plurality of feature quantity models classified in each feature quantity model group. The mapping unit maps the representative model to the character contained in the character list.

The mapping unit may include a determining unit for determining a target character, a retrieval unit for searching, in accordance with the character list, the video content in which the target character appears and retrieving the feature quantity model generated from the searched video content, a determining unit for determining a plurality of feature quantity models having a high correlation to each other from among the retrieved feature quantity models, and a map generating unit for generating a center model serving as a center of the plurality of feature quantity models determined as having the high correlation to each other and mapping the center model to the target character.

The list generating unit may generate the character list including a group composed of a plurality of characters based on the metadata of the video content.

The detecting unit may detect the character's face image regardless of a looking face angle thereof from the video content, and the mapping unit may map to the same character a plurality of feature quantity models generated based on the face images detected at different looking face angles.

In accordance with one embodiment of the present invention, an information processing method of an information processing apparatus for generating a database indicating mapping between characters and the characters' face images, includes steps of generating a list of characters, appearing in a video content, based on metadata of the video content, detecting a character's face image from the video content, generating a feature quantity model indicating a feature of the detected character's face image and mapping the feature quantity model generated based on the video content to a character contained in the character list.

In accordance with one embodiment of the present invention, a computer program for causing a computer to generate a database indicating mapping between characters and the characters' face images, includes steps of generating a list of characters, appearing in a video content, based on metadata of the video content, detecting a character's face image from the video content, generating a feature quantity model indicating a feature of the detected character's face image and mapping the feature quantity model generated based on the video content to a character contained in the character list.

In accordance with one embodiment of the present invention, the list of characters, appearing in the video content, is generated based on the metadata of the video content, the character's face image is detected from the video content, the feature quantity model indicating the feature of the detected character's face image is generated and the feature quantity model generated from the video content is mapped to a character contained in the character list.

In accordance with embodiments of the present invention, the database indicating the mapping between the characters and the characters' face images is automatically constructed based on the video content.

BRIEF DESCRIPTION OF THE DRAWINGS

FIG. 3 illustrates a content DB of FIG. 2;

FIG. 4 illustrates a character-related information DB of FIG. 2;

FIG. 5 illustrates a character list of FIG. 2;

FIG. 6 illustrates a character and feature quantity model DB of FIG. 2;

FIG. 10 is a block diagram illustrating a computer.

DESCRIPTION OF THE PREFERRED EMBODIMENTS

Before describing an embodiment of the present invention, the correspondence between the features of the present invention and an embodiment disclosed in the specification or the drawings of the invention is discussed below. This statement is intended to assure that embodiments supporting the claimed invention are described in this specification or the drawings. Thus, even if an embodiment is described in the specification or the drawings, but not described as relating to a feature of the invention herein, that does not necessarily mean that the embodiment does not relate to that feature of the invention. Conversely, even if an embodiment is described herein as relating to a certain feature of the invention, that does not necessarily mean that the embodiment does not relate to other features of the invention.

Figure 2:
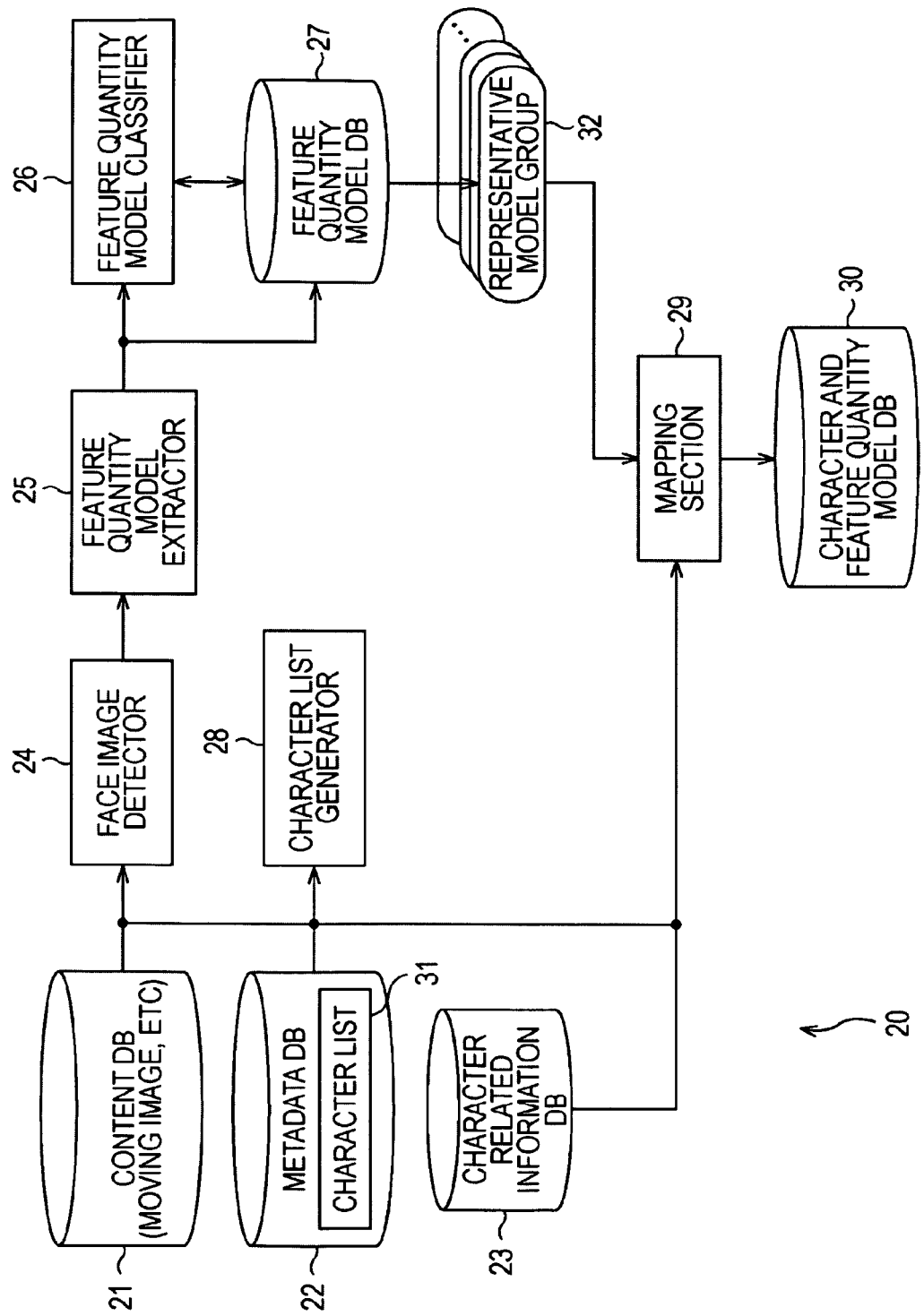
FIG. 2 is a block diagram illustrating a character and feature quantity model database (DB) generator in accordance with one embodiment of the present invention.

In accordance with one embodiment of the present invention, an information processing apparatus (for example, character and feature content model DB generator 20 of FIG. 2) for generating a database indicating mapping between characters and the characters' face images, includes a list generating unit (for example, character list generator 28 of FIG. 2) for generating a list of characters, appearing in a video content, based on metadata of the video content, a detecting unit (for example, face image detector 24 of FIG. 2) for detecting a character's face image from the video content, a model generating unit (for example, feature quantity model extractor 25 of FIG. 2) for generating a feature quantity model indicating a feature of the detected character's face image, and a mapping unit (for example, mapping section 29 of FIG. 2) for mapping the feature quantity model generated based on the video content to a character contained in the character list.

The information processing apparatus may further include a classifying unit (for example, feature quantity model classifier 26 of FIG. 2) for classifying into feature quantity model groups a plurality of feature quantity models, generated from the video content, according to a similarity and generating a representative model representing a plurality of feature quantity models classified in each feature quantity model group.

Figure 7:
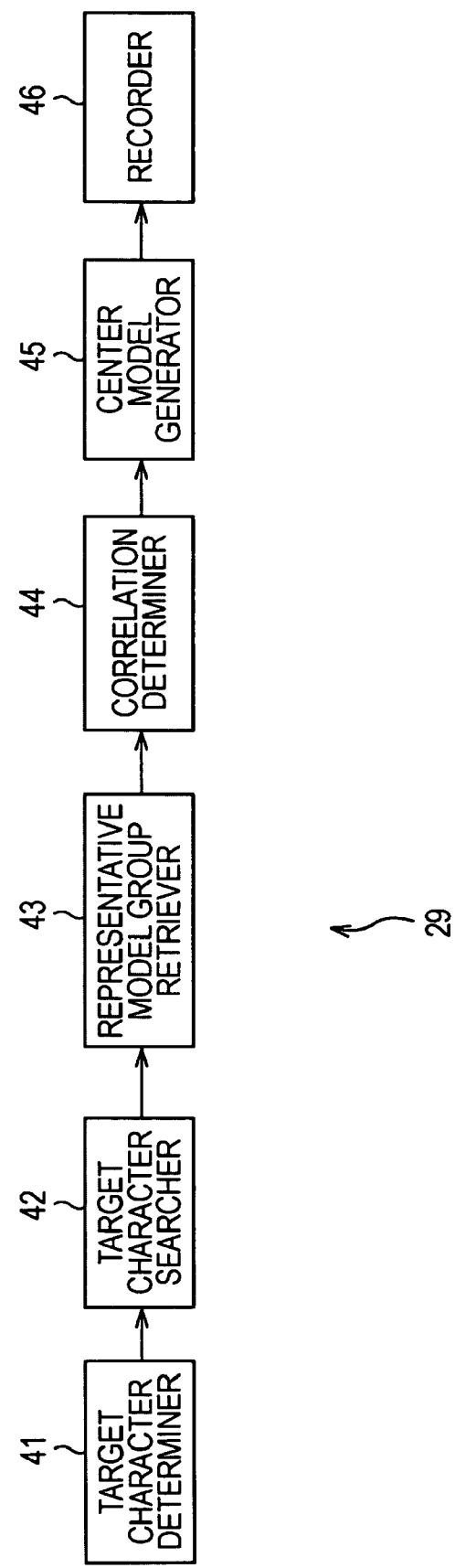
FIG. 7 is a block diagram illustrating a mapping section of FIG. 2.

The mapping unit may include a determining unit (for example, target character determiner 41 of FIG. 7) for determining a target character, a retrieval unit (for example, target character searcher 42 and representative model group retriever 43 of FIG. 7) for searching, in accordance with the character list, the video content in which the target character appears and retrieving the feature quantity model generated based on the searched video content, a determining unit (for example, correlation determiner 44 of FIG. 7) for determining a plurality of feature quantity models having a high correlation to each other from among the retrieved feature quantity models, and a map generating unit (for example, center model generator 45 of FIG. 7) for generating a center model serving as a center of a plurality of feature quantity models determined as having a high correlation to each other and mapping the center model to the target character.

Figure 8:
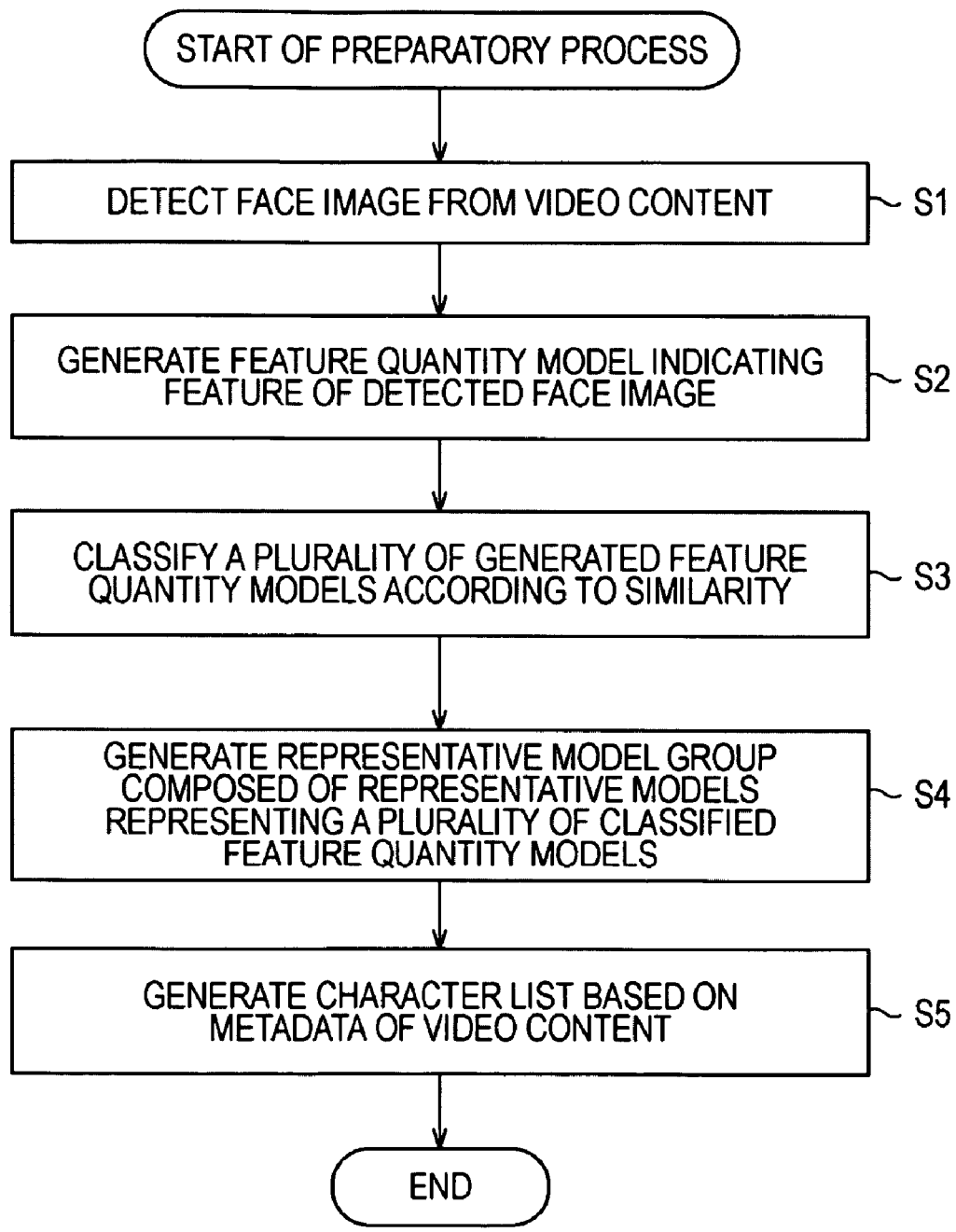
FIG. 8 is a flowchart illustrating a preparatory process.

In accordance with one embodiment of the present invention, one of an information processing method and a computer program of an information processing apparatus for generating a database indicating mapping between characters and the characters' face images, includes steps of generating a list of characters, appearing in a video content, based on metadata of the video content (for example, step S5 of FIG. 8), detecting a character's face image from the video content (for example, step S2 of FIG. 8), generating a feature quantity model indicating a feature of the detected character's face image (for example, step S3 of FIG. 8) and mapping the feature quantity model generated based on the video content to a character contained in the character list (for example, step S16 of FIG. 8).

The embodiments of the present invention are described below with reference to the drawings.

An information providing system 10 of one embodiment of the present invention is described below with reference to FIG. 1. The information providing system 10 includes a character and feature quantity model database (DB) generator. A character and feature content model DB is used in the information providing system 10.

The information providing system 10 includes an information providing apparatus 11, a character-related information DB 23 and an character and feature quantity model DB 30. The information providing apparatus 11 receives facial photos and facial composite drawings and provides a user with information related to a character (person) corresponding to the input facial photo. The character-related information DB 23 stores character information related to characters appearing in a video content, such as show business people, intellectuals, athletes, and politicians, and character-related information mapped to the characters. The character and feature quantity model DB 30 stores the character information and feature quantity models indicating the feature of each character mapped to the character information.

The information providing apparatus 11 generates a feature quantity model indicating a feature of the facial photo and facial composite drawing input from an operator, searches for a feature quantity model having the highest correlation with the generated feature quantity model by referencing the character and feature quantity model DB 30, and identifies the character matching the search results. The information providing apparatus 11 retrieves the character-related information of the identified character from the character-related information DB 23 and supplies the retrieved information to the operator.

The character-related information DB 23 is prepared beforehand (as described in detail later). The character and feature quantity model DB 30 is constructed by a character and feature quantity model DB generator 20 of FIG. 2.

The character and feature content model DB generator 20 in accordance with one embodiment of the present invention is described below with reference to FIG. 2. The character and feature content model DB generator 20 constructs the character and feature quantity model DB 30.

The character and feature content model DB generator 20 includes a content DB 21, a metadata DB 22, a character-related information DB 23, a face image detector 24, a feature quantity model extractor 25, a feature quantity model classifier 26, a feature quantity model DB 27, a character list generator 28 and a mapping section 29. The content DB 21 stores the video content. The metadata DB 22 stores metadata corresponding to the video content stored on the content DB 21. The character-related information DB 23 stores the character-related information. The face image detector 24 detects a face image from the video content. The feature quantity model extractor 25 generates a feature quantity model indicating a feature of the detected face image. The feature quantity model classifier 26 classifies numerous generated feature quantity models according to similarity. The feature quantity model DB 27 stores the feature quantity models. The character list generator 28 generates a character list 31 of characters appearing in the video content based on the metadata of the video content. The mapping section 29 maps the feature quantity model to the character contained in the character list 31.

The video content contains a moving image such as a television program and a still image such as news photos or gravure pictures. As shown in FIG. 3, the content DB 21 stores a content ID (identification), namely, unique identification information, identifying the video content and location information indicating the location of storage of actual data of the video content (moving image data, still image data, etc) with the content ID mapped to the location information. The content DB 21 retrieves the actual data of the video content in accordance with the stored location information and outputs the actual data to each of the face image detector 24 and the mapping section 29. The content DB 21 may store the actual data of the video content.

The metadata DB 22 stores the metadata of the video content stored on the content DB 21 and the content ID mapped to the metadata. The metadata includes EPG (electronic program guide) such as a program name, broadcasting date and time, channel, casting, program content, etc., if the video content is a television program. In cases other than the television program, the metadata is general attribute information containing the name of a character appearing in the video content. The metadata DB 22 stores the character list 31 and the content ID mapped to the character list 31. The character list 31 is generated by the character list generator 28.

The character-related information DB 23 stores character information related to characters appearing in a video content, such as show business people, intellectuals, athletes, and politicians, and character-related information mapped to the characters.

FIG. 4 illustrates items in the character-related information stored on the character-related information DB 23. The character-related information includes a name of a character, a pronunciation guidance of the name, an alphabetical presentation of the name, a home town, a birthday, debut time, related character ID, URL (uniform resource locator) of an official home page of the character, and other information, each item mapped to the character ID.

A character ID may be assigned to a group composed of a plurality of characters. If each member of the group separately appears in the video content, the member is assigned the member's own character ID. The related character ID mapped to the character-related information of the member of the group contains the character ID of the group and the character ID of another member of the group. Each group is recorded with the group member mapped mutually thereto. Even if a group name is described in the character list, the face of each individual group member is mapped.

The character-related information DB 23 may further contain a content ID of the video content and time information of time at which the character appears in the video content.

Referring to FIG. 2, the video content is retrieved from the content DB 21 and a character face in the video of the retrieved video content is detected. The face image detector 24 detects the character image not only in full face but also when the character face looks away at various angles (for example, turning around right by 10 degrees away from the frontward direction or turning around left by 45 degrees away from the frontward direction). The character as a subject may also be photographed from a variety of angles. The face image detector 24 outputs detection results to the feature quantity model extractor 25. If the video content is a moving image, a plurality of face images is detected even if a single character performs in the video content. The face images, if detected at different angles in consecutive scenes, may be from the same person in many cases. The feature quantity model classifier 26 as a subsequent element then stores information that indicates consecutive detections so that the plurality of detected face images are recognized as from the same person.

The feature quantity model extractor 25 generates the feature quantity model indicating the feature of the detected character face image. The feature quantity model extractor 25 also detects the looking face angle of the detected face and outputs the feature quantity model and the face angle to each of the feature quantity model classifier 26 and the feature quantity model DB 27. It is perfectly acceptable that the feature quantity model is generated on a per face angle basis. Alternatively, the feature quantity model may be generated for the full face image detected and a feature quantity model for another face angle may be generated based on the full-face feature quantity model generated.

For example, techniques disclosed in Japanese Unexamined Patent Application Publication No. 2002-189724 may be applied for the face image detector 24 and the feature quantity model extractor 25.

The feature quantity model classifier 26 calculates a similarity of a plurality of feature quantity models having the same face angle generated from a single video content and classifies the feature quantity models into a feature quantity model group so that each feature quantity model is composed of similar feature quantity models. A plurality of feature quantity models classified in the same feature quantity model group are considered as corresponding to the same person. The feature quantity model classifier 26 generates an average model of each feature quantity model group (hereinafter referred to as a representative model) and outputs the representative model to the feature quantity model DB 27. If characters do not resemble in face, representative models of the number larger than the number of characters are generated. If the feature quantity models of different face angles are generated, representative models of different angles are thus generated for the same character.

A plurality of representative models generated from a single video content is referred to as a representative model group 32. More specifically, the representative model group 32 contains the representative model of each of the characters performing in the single video content. Instead of generating the representative model, the feature quantity model group as a result of classification of the feature models may be output to the feature quantity model DB 27. However, the generation of the representative model allows an amount of calculation in later element to be reduced.

The feature quantity model DB 27 stores the feature quantity model generated by the feature quantity model extractor 25 and the representative model generated by the feature quantity model classifier 26. The feature quantity model DB 27 may also store the feature quantity model group classified by the feature quantity model classifier 26.

Based on the metadata of the video content, the character list generator 28 generates the character list 31 of the characters performing in the video content and outputs the generated character list 31 to the metadata DB 22. As shown in FIG. 5, the character list 31 contains a listing of character IDs of characters described in the metadata (retrieved from the character-related information DB 23), casting (actor, actress, producer, writer), and order of displaying (in the metadata (in particular, EPG), each mapped to the content ID. The mapping section 29 in a later element uses the order of displaying in the metadata as information related to a time length of performance of each character and importance of the character.

The mapping section 29 determines a character to whom the operator wants to map the feature quantity model (hereinafter referred to as a target character). The mapping section 29 identifies a plurality of video contents in which the target character performs, compares the character list 31 and the representative model group 32, each corresponding to the identified video content, for mapping, generates the feature quantity model (center model) corresponding to the target character, and outputs the center model to the character and feature quantity model DB 30 for storage. When a plurality of video contents is identified, video contents of the same series may be handled as a single video content. The character and the representative model group 32 may be mapped to each other based on the representative model group 32 corresponding to only a single video content.

In response to the output from the mapping section 29, the character and feature quantity model DB 30 stores the character ID and the feature quantity model mapped to the character ID. FIG. 6 illustrates a data structure of the character and feature quantity model DB 30. Each character ID contains a face angle in which the face image looks in the video content (for example, full face or 45 degrees turned around right), photograph date (year and date), type indicating special makeup and disguise (normal, makeup 1, makeup 2, etc.), feature quantity model ID as identification information of a feature quantity model, probability indicating accuracy of mapping between the character and the feature quantity model and manual updating history indicating a history of manual correction and update of each item, all mapped to each other. If a change in feature quantity model is small with different photographing dates, these data may be merged. In this way, an excessive increase in the data size of the character and feature quantity model DB 30 is controlled.

The character and feature quantity model DB 30 stores a plurality of feature quantity models mapped to a single character. More specifically, a character having the same character ID but different values in other items may be recorded. In this way, if the character in the video content changes in face with age, make up, or disguise, the feature quantity model in each state is mapped to the same character ID and recognized as the one for the same character.

As the character appears in more video contents, the face image are detected more frequently and the probability becomes higher. For example, if a duo of characters A and B always perform together in each video content, feature quantity models a and b are mapped to the characters A and B, respectively. Each of mapping probabilities of the character A to the feature quantity model a, the character A to the feature quantity model b, the character B to the feature quantity model a and the character B to the feature quantity model b is 50%.

FIG. 7 illustrates a structure of the mapping section 29.

The mapping section 29 includes a target character determiner 41, a target character searcher 42, a representative model group retriever 43, a correlation determiner 44, a center model generator 45 and a recorder 46. The target character determiner 41 determines a target character. Based on the character list 31 on the metadata DB 22, the target character searcher 42 identifies a plurality of video contents in which the target character performs. The representative model group retriever 43 retrieves from the feature quantity model DB 27 the representative model group 32 corresponding to the plurality of identified video contents. The correlation determiner 44 selects a plurality of representative models corresponding to the target character based on a correlation of the representative model contained in the plurality of representative model groups 32. The center model generator 45 generates a center model from the plurality of selected representative models. The recorder 46 causes the character and feature quantity model DB 30 to store the generated center model with the target character mapped thereto.

When a preparatory process (to be discussed later) ends with a new video content added to the content DB 21, the target character determiner 41 determines the target character by selecting sequentially characters in the video content. The target character searcher 42 identifies a plurality of video contents showing the target character except the video content in which a character other than the target character also performs together throughout.

The correlation determiner 44 calculates the correlation of the representative models among the plurality of retrieved representative model groups 32 and selects a combination of representative models having the highest correlation among the representative model groups. Instead of selecting the representative models having the highest correlation, the representative models having a correlation above a threshold value may be selected. If the correlations of all representative models of the representative model groups are calculated, the amount of calculation becomes extremely large. In such a case, the correlation may be calculated of several characters in the high order range of displaying in the character list 31. With this arrangement, the representative models to be selected are quickly selected, and the amount of calculation of correlation is reduced.

The center model generator 45 generates as a center model a feature quantity model having an approximately equal correlation to each of the plurality of selected representative models.

The preparatory process for generating the character and feature quantity model DB 30 is described below with reference to a flowchart of FIG. 8.

In the preparatory process, the character list 31 and the representative model group 32 are generated for each video content. For example, when a new video content is added to the content DB 21, the preparatory process is performed on the added video content.

In step S1, the face image detector 24 retrieves from the content DB 21 a video content to be processed, detects a character face in the video of the retrieved video content, and outputs the character face to the feature quantity model extractor 25. In step S2, the feature quantity model extractor 25 generates a feature quantity model indicating the feature of the detected character face. The feature quantity model extractor 25 detects the face angle of the detected face and outputs the feature quantity model and the face angle to each of the feature quantity model classifier 26 and the feature quantity model DB 27.

The face detection is completed from the entire video content, and the feature quantity model of each detected face is generated and stored on the feature quantity model DB 27. Processing proceeds to step S3.

In step S3, the feature quantity model classifier 26 calculates the similarity of a plurality of feature quantity models at the same face angle generated from the video content to be processed. The feature quantity model classifier 26 classifies the resulting similar feature quantity models into the same feature quantity model group. In step S4, the feature quantity model classifier 26 generates a representative model representing each feature quantity model group and outputs to the feature quantity model DB 27 the representative model group 32 composed of a plurality of generated representative models. The feature quantity model DB 27 stores the input representative model group 32 with the content ID mapped thereto.

In step S5, the character list generator 28 retrieves from the metadata DB 22 the metadata of the video content to be processed. Based on the retrieved metadata, the character list generator 28 generates the character list 31 of the characters related to the video content to be processed and outputs the generated character list 31 to the metadata DB 22. The metadata DB 22 stores the input character list 31 with the content ID mapped thereto.

The process in steps S1 through S4 of generating the representative model group 32 and the process in step S5 of generating the character list 31 may be carried out in reverse order or concurrently.

The preparatory process of the video content to be processed has been described.

Figure 9:
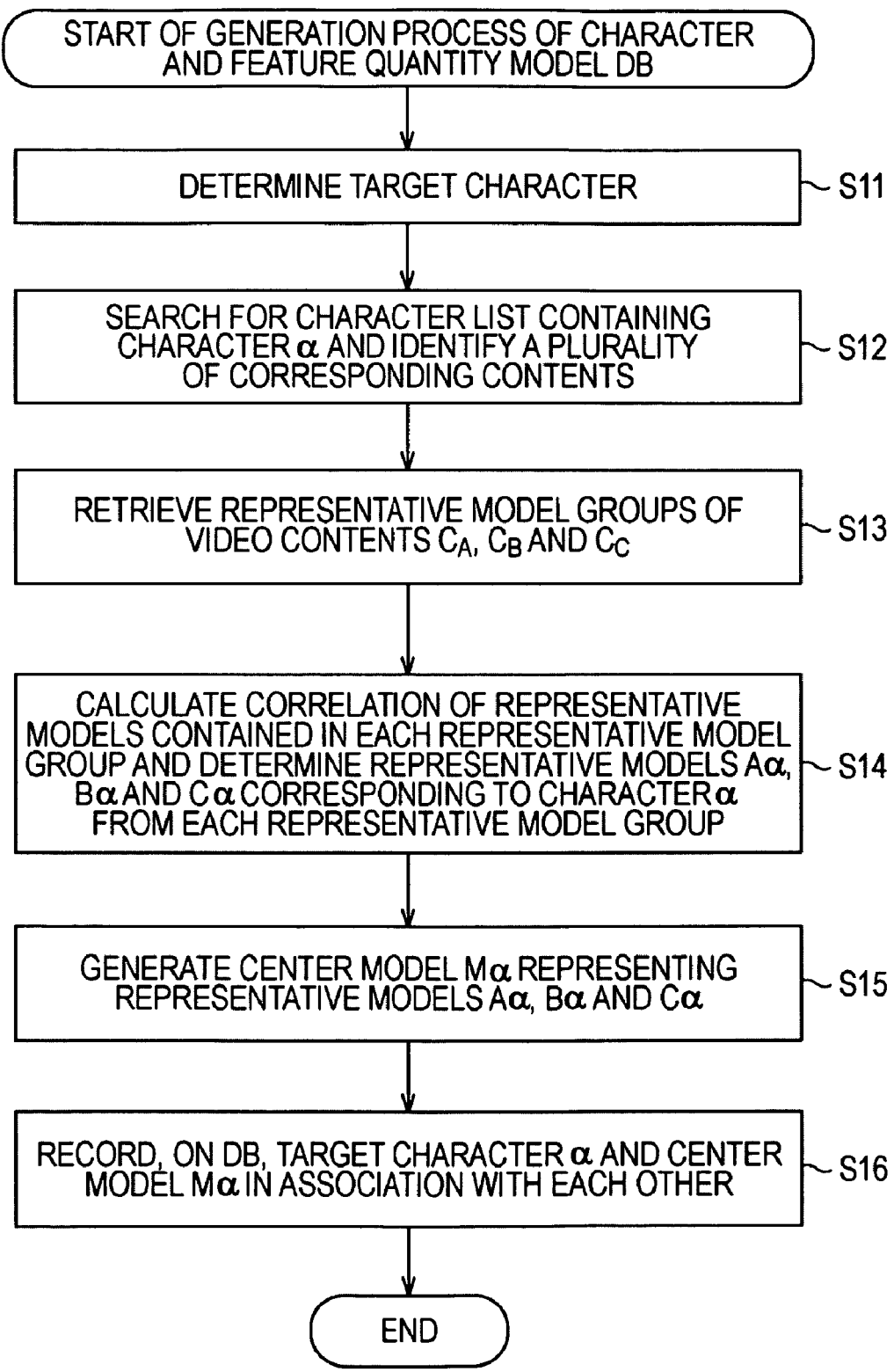
FIG. 9 is a flowchart illustrating a character and feature quantity model DB generation process.

A character and feature quantity model generation process of generating the character and feature quantity model DB 30 is described below with reference to a flowchart of FIG. 9.

The character and feature quantity model generation process is performed after a certain number of video contents, each with the character list 31 and the representative model group 32, has been accumulated. More specifically, at least two video contents are accumulated throughout which a character desired to be mapped to a feature quantity model (target character) performs with no other character accompanying the target character continuously.

In step S11, the target character determiner 41 retrieves from the metadata DB 22 the character list 31 containing a new video content $C_A$ added to the content DB 21 and selects sequentially the characters listed in the character list 31. The target character determiner 41 thus determines the target character $\alpha$.

In step S12, the target character searcher 42 references the character list 31 on the metadata DB 22 to identify a video content in which the target character a performs with no other characters appearing together throughout. The character list 31 corresponding to the identified video content is retrieved from the metadata DB 22.

In addition to the video content $C_A$, video contents $C_B$ and $C_C$ may be now identified. The representative model group 32 corresponding to each of the video contents $C_A$, $C_B$ and $C_C$ contains a representative model indicating the feature of the face of the target character $\alpha$. The following process is performed based on the assumption that these models have a high correlation.

In step S13, the representative model group retriever 43 retrieves from the feature quantity model DB 27 the representative model group 32 corresponding to each of the video contents $C_A$, $C_B$ and $C_C$ and outputs the representative model group 32 to the correlation determiner 44.

In step S14, the correlation determiner 44 calculates the correlation of the representative models among the plurality of retrieved representative model groups 32, selects a combination of the representative models having the highest correlation among the representative models, and outputs the selected combination of representative models to the center model generator 45. Let A$\alpha$ represent a representative model selected from the representative model group in the video content $C_A$, B$\alpha$ represent a representative model selected from the representative model group in the video content $C_B$ and C$\alpha$ represent a representative model selected from the representative model group in the video content $C_C$.

In step S15, the center model generator 45 generates a center model M$\alpha$ having an approximately equal correlation to each of the selected representative models A$\alpha$, B$\alpha$ and C$\alpha$ and then outputs the center model M$\alpha$ to the recorder 46. In step S16, the recorder 46 attaches a feature quantity model ID to the input center model M$\alpha$ and then records the center model M$\alpha$ onto the character and feature quantity model DB 30. The recorder 46 causes the character and feature quantity model DB 30 to record the character ID of the target character $\alpha$ with the feature quantity model ID of the center model mapped thereto. In addition to the feature quantity model ID of the center model M$\alpha$, information containing the face angle, the photographing date, the type and the probability are also recorded.

The character and feature quantity model generation process is thus completed. By repeating the character and feature model generation process, the accuracy of the feature quantity model of the same character is increased on the character and feature quantity model DB 30 and the number of feature quantity models is increased.

The character and feature quantity model DB 30 thus constructed may be corrected, updated and modified. For example, the character and feature quantity model DB 30 may be publicly disclosed on the Internet in the hope that any error is pointed out by viewers. If the same error is pointed out by viewers of the number above a predetermined threshold, the character and feature quantity model DB 30 may be corrected.

Figure 1:
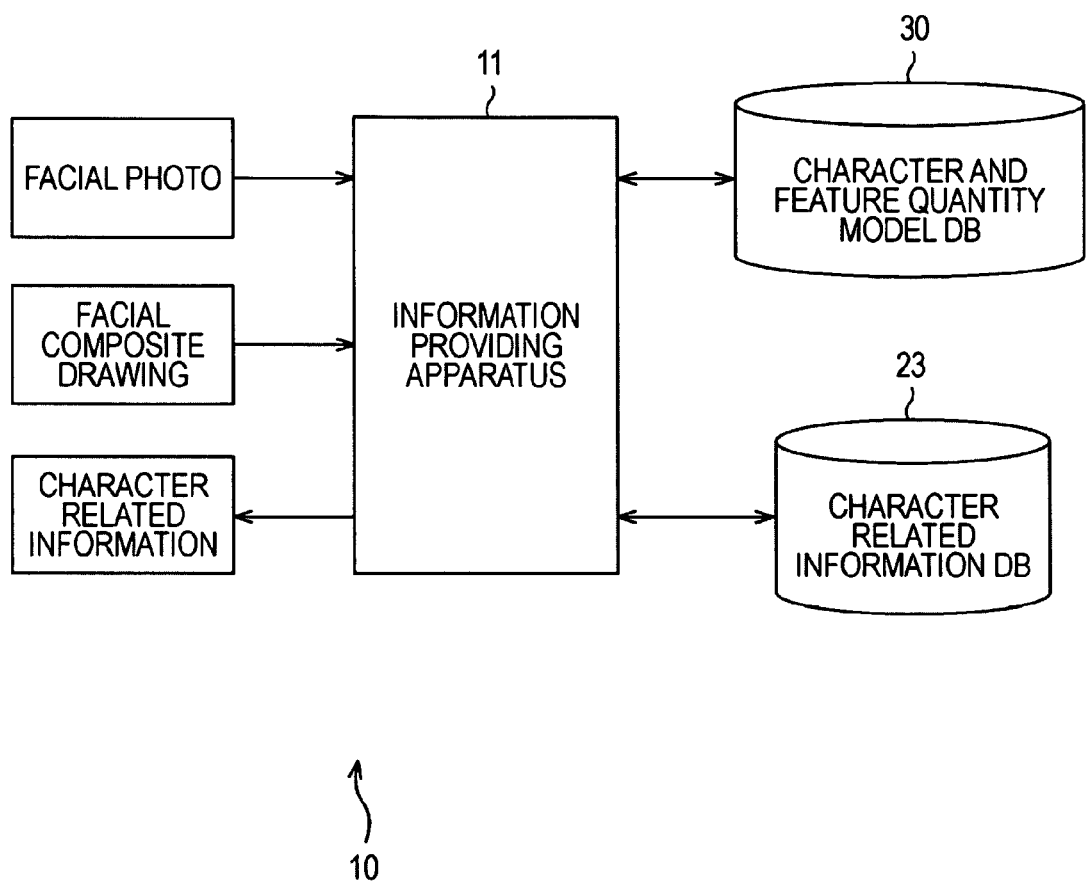
FIG. 1 is a block diagram illustrating an information providing system in accordance with one embodiment of the present invention.

The information providing system 10 of FIG. 1 including the character and feature quantity model DB 30 generated receives the face images and facial composite drawings from the operator and outputs the character-related information of the corresponding character. The information providing system 10 may also display a web page from which a user can purchase products related to the character (such as compact disks (CDs), compact versatile disks (DVDs) or books) or products publicized by the character. The information providing system 10 may find other applications. For example, by inputting the face image of any person, an actress having a similar face may be searched, and a makeup technique of the actress may be learned. By inputting a video content and a character, a scene performing in the video content may be output. By inputting one video scene, a content ID of the corresponding video content and time information (time stamp) of the video scene may be output.

The series of process steps described above may be performed using one of the hardware of FIG. 2 and software. If the process steps are performed using software, a program forming the software is installed from a program recording medium to a computer built in dedicated hardware or a general-purpose computer that performs a variety of functions with a variety of programs installed thereon.

FIG. 10 is a block diagram illustrating a hardware structure of a computer that executes the above-referenced process steps.

In the computer, a central processing unit (CPU) 101, a read-only memory (ROM) 102 and a random-access memory (RAM) 103 are interconnected to each other via a bus 104.

The bus 104 also connects to an input-output interface 105. The input-output interface 105 connects to an input unit 106 including a keyboard, a mouse and a microphone, an output unit 107 including a display and a loudspeaker, a storage 108 including a hard disk and a non-volatile memory, a communication unit 109 including a network interface and a drive 110 driving a recording medium 111 such as one of a magnetic disk, an optical disk, a magneto-optical disk and a semiconductor memory.

The computer thus constructed performs the above-referenced process steps when the CPU 101 loads the program stored on the storage 108 to the RAM 103 via the input-output interface 105 and the bus 104 and executes the loaded program.

The program may be executed in the order of the process steps described above. Alternatively, the process steps of the program may be performed in parallel or at a timing a call takes place.

The program may be executed by a single computer or a plurality of computers. The program may be transferred to a remote computer for execution.

The term system in the specification may refer to a system including a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for generating a database indicating mapping between characters and the characters' face images, comprising:
    list generating means for generating a list of characters, appearing in contents data, based on metadata of the contents data;
    detecting means for detecting a character's face image from the contents data;
    model generating means for generating a feature quantity model indicating a feature of the detected character's face image; and
    mapping means for mapping the feature quantity model generated based on the contents data to a character contained in the character list,
    wherein the mapping means comprises:
        determining means for determining a target character;
        retrieval means for searching, in accordance with the character list, the contents data in which the target character appears and retrieving the feature quantity model generated from the searched contents data;
        determining means for determining a plurality of feature quantity models having a high correlation to each other from among the retrieved feature quantity models; and
        map generating means for generating a center model serving as a center of the plurality of feature quantity models determined as having the high correlation to each other and mapping the center model to the target character.

2. The information processing apparatus according to claim 1, further comprising classifying means for classifying into feature quantity model groups a plurality of feature quantity models, generated from the contents data, according to a similarity and generating a representative model representing a plurality of feature quantity models classified in each feature quantity model group,
    wherein the mapping means maps the representative model to a character contained in the character list.

3. The information processing apparatus according to claim 1, wherein the list generating means generates the character list including a group composed of a plurality of characters based on the metadata of the contents data.

4. The information processing apparatus according to claim 1, wherein the detecting means detects the character's face image regardless of a looking face angle thereof from the contents data, and
    wherein the mapping means maps to the same character a plurality of feature quantity models generated from the face images detected at different looking face angles.

5. An information processing method of an information processing apparatus for generating a database indicating mapping between characters and the characters' face images, comprising steps of:
    generating a list of characters, appearing in contents data, based on metadata of the contents data;
    detecting a character's face image from the contents data;
    generating a feature quantity model indicating a feature of the detected character's face image; and
    mapping the feature quantity model generated based on the contents data to a character contained in the character list,
    wherein mapping the feature quantity model comprises:
        determining a target character;
        searching, in accordance with the character list, the contents data in which the target character appears and retrieving the feature quantity model generated from the searched contents data;
        determining a plurality of feature quantity models having a high correlation to each other from among the retrieved feature quantity models; and
        generating a center model serving as a center of the plurality of feature quantity models determined as having the high correlation to each other and mapping the center model to the target character.

6. A nontransitory computer-readable storage medium encoded with a computer program, which when executed by a computer, causes the computer to perform operations to generate a database indicating mapping between characters and the characters' face images, the operations comprising steps of:
    generating a list of characters, appearing in contents data, based on metadata of the contents data;
    detecting a character's face image from the contents data;
    generating a feature quantity model indicating a feature of the detected character's face image; and
    mapping the feature quantity model generated based on the contents data to a character contained in the character list,
    wherein mapping the feature quantity model comprises:
        determining a target character;
        searching, in accordance with the character list, the contents data in which the target character appears and retrieving the feature quantity model generated from the searched contents data;
        determining a plurality of feature quantity models having a high correlation to each other from among the retrieved feature quantity models; and
        generating a center model serving as a center of the plurality of feature quantity models determined as having the high correlation to each other and mapping the center model to the target character.

7. An information processing apparatus for generating a database indicating mapping between characters and the characters' face images, comprising:
    a list generating unit generating a list of characters, appearing in a contents data, based on metadata of the contents data;
    a detecting unit detecting a character's face image from the contents data;

a model generating unit generating a feature quantity model indicating a feature of the detected character's face image; and a mapping unit mapping the feature quantity model generated based on the contents data to a character contained in the character list, wherein the mapping unit comprises:

a first determining unit for determining a target character;

a retrieval unit for searching, in accordance with the character list, the contents data in which the target character appears and retrieving the feature quantity model generated from the searched contents data;

a second determining unit for determining a plurality of feature quantity models having a high correlation to each other from among the retrieved feature quantity models; and a map generating unit for generating a center model serving as a center of the plurality of feature quantity models determined as having the high correlation to each other and mapping the center model to the target character.

* * * * *